(12) United States Patent
Civanlar et al.

(10) Patent No.: US 9,426,536 B2
(45) Date of Patent: Aug. 23, 2016

(54) SYSTEMS, METHODS AND COMPUTER READABLE MEDIA FOR INSTANT MULTI-CHANNEL VIDEO CONTENT BROWSING IN DIGITAL VIDEO DISTRIBUTION SYSTEMS

(71) Applicant: Delta Vidyo, Inc., Hackensack, NJ (US)

(72) Inventors: Reha Civanlar, Istanbul (TR); Ofer Shapiro, Fair Lawn, NY (US); Tal Shalom, Fair Lawn, NJ (US)

(73) Assignee: VIDYO, INC., Hackensack, NJ (US)

( * ) Notice: Subject to any disclaimer, the term of this patent is extended or adjusted under 35 U.S.C. 154(b) by 466 days.

(21) Appl. No.: 13/895,131

(22) Filed: May 15, 2013

(65) Prior Publication Data

US 2013/0254817 A1  Sep. 26, 2013

Related U.S. Application Data

(63) Continuation of application No. 12/765,793, filed on Apr. 22, 2010, now Pat. No. 8,607,283.

(60) Provisional application No. 61/172,355, filed on Apr. 24, 2009.

(51) Int. Cl.
*H04N 7/173* (2011.01)
*H04N 21/643* (2011.01)
(Continued)

(52) U.S. Cl.
CPC ....... *H04N 21/64322* (2013.01); *G11B 27/105* (2013.01); *H04N 5/783* (2013.01);
(Continued)

(58) Field of Classification Search
CPC ............. H04N 21/234327; H04N 21/440227; H04N 21/64322; H04N 21/234363; H04N 21/234381; H04N 21/431; H04N 21/4314; H04N 21/4383; H04N 21/4384; H04N 21/44027; H04N 21/4621; H04N 21/8549; H04N 5/765; H04N 5/772; H04N 5/775; H04N 5/783; H04N 5/85; H04N 9/8042; H04N 9/8205; H04N 19/33; H04N 19/31; H04N 19/40; H04N 19/162
USPC .................................................... 725/54, 91
See application file for complete search history.

(56) References Cited

U.S. PATENT DOCUMENTS 5,555,244 A   9/1996  Gupta et al.
6,055,012 A   4/2000  Haskell et al.
(Continued)

FOREIGN PATENT DOCUMENTS

CN        1636394 A    7/2005
CN      101073271 A   11/2007
(Continued)

OTHER PUBLICATIONS

U.S. Appl. No. 12/765,793, Sep. 18, 2013 Issue Fee payment.
(Continued)

*Primary Examiner* — Pankaj Kumar
*Assistant Examiner* — Reuben M Brown
(74) *Attorney, Agent, or Firm* — Baker Botts L.L.P.

(57) ABSTRACT

Techniques for delivery and presentation/display of audio-visual signals over electronic communications network channels are disclosed herein. In an exemplary embodiment, a video server for an IPTV system is disclosed. The system includes a video extractor/transporter (shortly referred to as video extractor) for extracting encoded audio-visual signals from at least one video source, and distributing the signals over the electronic communications network channels. The system also includes control logic which can receive control messages from receivers and invoke the video extractor to extract audio-visual signals therefrom.

5 Claims, 10 Drawing Sheets

(51) Int. Cl.

| | | |
|---|---|---|
| G11B 27/10 | (2006.01) | |
| H04N 5/783 | (2006.01) | |
| H04N 21/2343 | (2011.01) | |
| H04N 21/431 | (2011.01) | |
| H04N 21/438 | (2011.01) | |
| H04N 21/4402 | (2011.01) | |
| H04N 21/462 | (2011.01) | |
| H04N 21/8549 | (2011.01) | |
| H04N 19/61 | (2014.01) | |
| H04N 19/162 | (2014.01) | |
| H04N 19/33 | (2014.01) | |
| H04N 19/31 | (2014.01) | |
| H04N 19/40 | (2014.01) | |
| H04N 7/16 | (2011.01) | |
| H04N 5/765 | (2006.01) | |
| H04N 5/77 | (2006.01) | |
| H04N 5/775 | (2006.01) | |
| H04N 5/85 | (2006.01) | |
| H04N 9/804 | (2006.01) | |
| H04N 9/82 | (2006.01) | |

(52) U.S. Cl.
CPC ........... *H04N 19/162* (2014.11); *H04N 19/31* (2014.11); *H04N 19/33* (2014.11); *H04N 19/40* (2014.11); *H04N 19/61* (2014.11); *H04N 21/234327* (2013.01); *H04N 21/234363* (2013.01); *H04N 21/234381* (2013.01); *H04N 21/431* (2013.01); *H04N 21/4314* (2013.01); *H04N 21/4383* (2013.01); *H04N 21/4384* (2013.01); *H04N 21/440227* (2013.01); *H04N 21/4621* (2013.01); *H04N 21/8549* (2013.01); *H04N 5/765* (2013.01); *H04N 5/772* (2013.01); *H04N 5/775* (2013.01); *H04N 5/85* (2013.01); *H04N 9/8042* (2013.01); *H04N 9/8205* (2013.01)

(56) References Cited

U.S. PATENT DOCUMENTS

| | | | |
|---|---|---|---|
| 6,167,084 A | 12/2000 | Wang et al. | |
| 6,275,531 B1 | 8/2001 | Li | |
| 6,292,512 B1 | 9/2001 | Radha et al. | |
| 6,496,217 B1 | 12/2002 | Piotrowski | |
| 6,498,865 B1 | 12/2002 | Brailean et al. | |
| 6,510,553 B1 | 1/2003 | Hazra | |
| 6,643,496 B1 | 11/2003 | Shimoyama et al. | |
| 6,912,584 B2 | 6/2005 | Wang et al. | |
| 6,973,622 B1 | 12/2005 | Rappaport et al. | |
| 7,012,893 B2 | 3/2006 | Bahadiroglu | |
| 7,912,098 B2 | 3/2011 | Cosquer et al. | |
| 8,094,719 B2 | 1/2012 | Liu et al. | |
| 8,341,672 B2 | 12/2012 | Civanlar et al. | |
| 8,607,283 B2* | 12/2013 | Civanlar | G11B 27/105 348/410.1 |
| 2002/0021761 A1* | 2/2002 | Zhang | H04N 19/89 375/240.27 |
| 2002/0129374 A1 | 9/2002 | Freeman et al. | |
| 2002/0136162 A1 | 9/2002 | Yoshimura et al. | |
| 2002/0163918 A1 | 11/2002 | Cline | |
| 2003/0074674 A1 | 4/2003 | Magliaro | |
| 2003/0135631 A1 | 7/2003 | Li et al. | |
| 2003/0156824 A1 | 8/2003 | Lu | |
| 2004/0001479 A1 | 1/2004 | Pounds et al. | |
| 2004/0031058 A1 | 2/2004 | Reisman | |
| 2004/0033061 A1 | 2/2004 | Hughes et al. | |
| 2004/0042549 A1 | 3/2004 | Huang et al. | |
| 2004/0046801 A1 | 3/2004 | Lin et al. | |
| 2004/0071354 A1 | 4/2004 | Adachi et al. | |
| 2004/0218816 A1 | 11/2004 | Hannuksela | |
| 2005/0117055 A1 | 6/2005 | Kerofsky | |
| 2005/0135477 A1 | 6/2005 | Zhang et al. | |
| 2005/0147164 A1 | 7/2005 | Wu et al. | |
| 2005/0254575 A1 | 11/2005 | Hannuksela et al. | |
| 2005/0265450 A1 | 12/2005 | Raveendran et al. | |
| 2005/0275752 A1 | 12/2005 | Li et al. | |
| 2006/0015637 A1 | 1/2006 | Chung | |
| 2006/0184966 A1 | 8/2006 | Hunleth et al. | |
| 2007/0003222 A1 | 1/2007 | Shingai | |
| 2007/0009039 A1 | 1/2007 | Ryu | |
| 2007/0073779 A1 | 3/2007 | Walker et al. | |
| 2007/0121584 A1 | 5/2007 | Qiu et al. | |
| 2007/0195203 A1 | 8/2007 | Walker et al. | |
| 2007/0203942 A1 | 8/2007 | Hua et al. | |
| 2008/0068446 A1* | 3/2008 | Barkley | H04N 7/147 348/14.07 |
| 2008/0148322 A1 | 6/2008 | Howcroft | |
| 2008/0155586 A1 | 6/2008 | Yang et al. | |
| 2008/0168523 A1 | 7/2008 | Ansari et al. | |
| 2008/0273079 A1 | 11/2008 | Campbell et al. | |
| 2009/0021592 A1 | 1/2009 | Oyama et al. | |
| 2009/0025028 A1 | 1/2009 | Cassanova et al. | |
| 2009/0030976 A1* | 1/2009 | Shukla | H04L 65/4015 709/203 |
| 2009/0185619 A1 | 7/2009 | Taleb et al. | |
| 2009/0187960 A1 | 7/2009 | Lee et al. | |
| 2009/0252217 A1* | 10/2009 | Wittig | H04N 21/4147 375/240.01 |
| 2009/0252228 A1 | 10/2009 | Boyce et al. | |
| 2010/0017506 A1* | 1/2010 | Fadell | H04M 15/00 709/224 |
| 2010/0067581 A1* | 3/2010 | Hong | H04N 19/105 375/240.16 |
| 2010/0161716 A1 | 6/2010 | Kajos et al. | |
| 2010/0259595 A1 | 10/2010 | Trimeche et al. | |
| 2010/0272187 A1 | 10/2010 | Civanlar et al. | |
| 2010/0275229 A1 | 10/2010 | Civanlar et al. | |
| 2010/0293584 A1 | 11/2010 | Civanlar et al. | |
| 2011/0116491 A1* | 5/2011 | Kovacs | H04N 21/234327 370/345 |
| 2013/0254817 A1* | 9/2013 | Civanlar | G11B 27/105 725/109 |

FOREIGN PATENT DOCUMENTS

| | | |
|---|---|---|
| CN | 101115196 A | 1/2008 |
| CN | 101341746 A | 1/2009 |
| EP | 0 852 445 | 7/1998 |
| EP | 1 713 280 | 10/2006 |
| EP | 1 830 540 | 9/2007 |
| WO | WO 02/33952 A2 | 4/2002 |
| WO | WO 2004/036916 | 4/2004 |
| WO | WO 2004/114667 | 12/2004 |
| WO | WO 2005/099271 | 10/2005 |

OTHER PUBLICATIONS

U.S. Appl. No. 12/765,815, Nov. 12, 2013 Response to Non-Final Office Action.
U.S. Appl. No. 12/765,815, Oct. 15, 2013 Non-Final Office Action.
U.S. Appl. No. 12/765,815, Sep. 23, 2013 Amendment and Request for Continued Examination (RCE).
U.S. Appl. No. 12/765,815, Sep. 9, 2013 Advisory Action.
U.S. Appl. No. 12/765,815, Aug. 26, 2013 Response to Final Office Action.
U.S. Appl. No. 12/765,767, Nov. 20, 2012 Issue Fee payment.
U.S. Appl. No. 12/765,767, Oct. 19, 2012 Notice of Allowance.
U.S. Appl. No. 12/765,767, Sep. 14, 2012 Response to Non-Final Office Action.
U.S. Appl. No. 12/765,767, Jun. 22, 2012 Non-Final Office Action.
U.S. Appl. No. 12/765,815, Jul. 1, 2013 Final Office Action.
U.S. Appl. No. 12/765,815, Mar. 11, 2013 Response to Non-Final Office Action.
U.S. Appl. No. 12/765,815, Jan. 8, 2013 Non-Final Office Action.
U.S. Appl. No. 12/765,793, Jun. 25, 2013 Notice of Allowance.
U.S. Appl. No. 12/765,793, May 15, 2013 Response to Final Office Action.
U.S. Appl. No. 12/765,793, May 10, 2013 Advisory Action.

(56) References Cited

OTHER PUBLICATIONS

U.S. Appl. No. 12/765,793, Apr. 19, 2013 Response to Final Office Action.
U.S. Appl. No. 12/765,793, Dec. 24, 2012 Final Office Action.
U.S. Appl. No. 12/765,793, Nov. 30, 2012 Response to Non-Final Office Action.
U.S. Appl. No. 12/765,793, Jul. 10, 2012 Non-Final Office Action.
Extended European search Report for EP 10767793.2, dated Oct. 1, 2012 (corresponds to U.S. Appl. No. 12/765,767).
Cees G.M. Snoek and Marcel Worring, "Multimodal Video Indexing: A Review of the State-of-the-art," Multimedia Tools and Applications, vol. 25, No. 1/Jan. 2005, Springer.
Michael A. Smith "Video Skimming and Chracterization through the Combination of image and language Understanding Techniques," p. 775, 1997 IEEE Computer Society Conference on Computer Vision and Pattern Recognition (CVPR '97), 1997.
S. Wenger, "Video Redundancy Coding in H.263+", Workshop on Audio-Visual Services for packet networks (aka Packet Video Workshop), 1997, 6 pages.
(ITU-T H.264) "ITU-T Recommendation H.264: Advanced Video Coding for Generic Audiovisual Services" in: International Relecommunication Union (On Line, {URL: http://www.itu.int/rec/T-Rec-H.264/en}Mar. 1, 2005 entire document.
RTSP, RFC2326, available at http://www.rfc-editor.org/rfc/rfc2326.txt.
RTP, RFC3550, available at http://www.rfc-editor.org/rfc/rfc3550.txt.
RFC3170, http://www.rfc-editor.org/rfc/rfc3170.txt.
U.S. Appl. No. 12/765,815, Jun. 20, 2014 Notice of Abandonment.
U.S. Appl. No. 12/765,815, Jan. 30, 2014 Applicant Initiated Interview Summary.
U.S. Appl. No. 12/765,815, Dec. 3, 2013 Final Office Action.
CN Office Action dated Dec. 16, 2015 in CN Patent Application No. 201080018333.7.

* cited by examiner

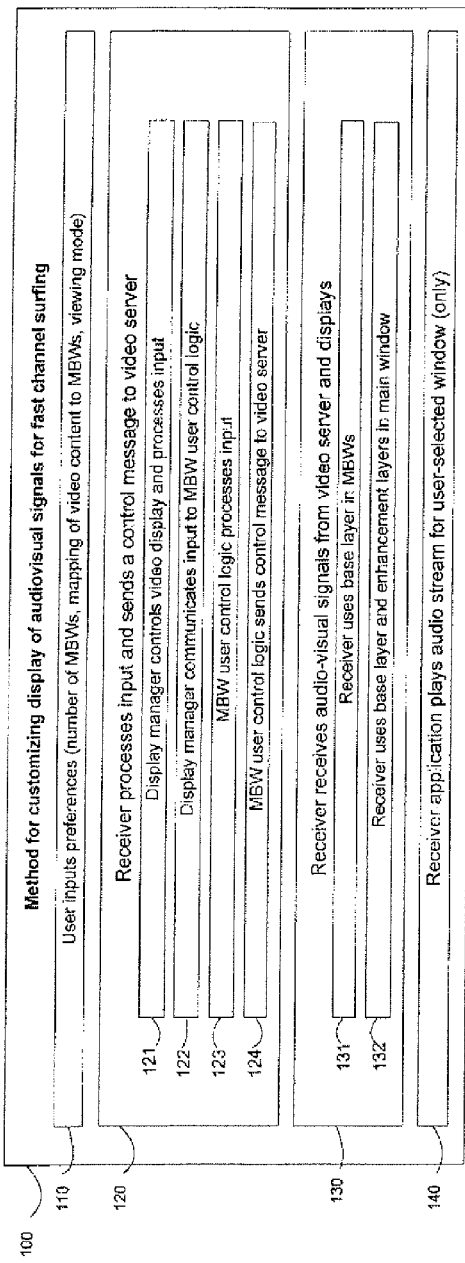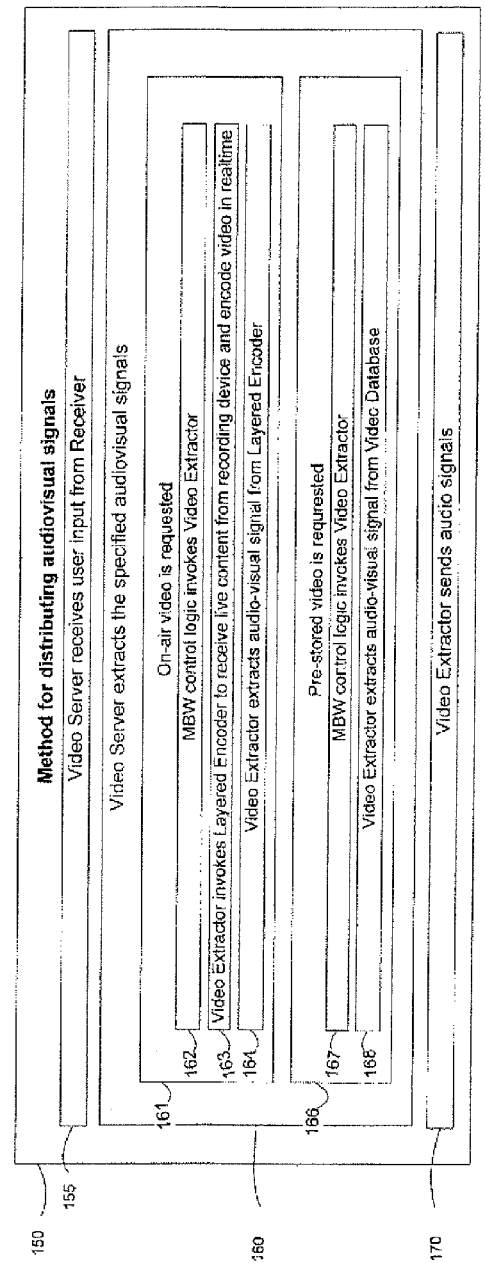

SYSTEMS, METHODS AND COMPUTER READABLE MEDIA FOR INSTANT MULTI-CHANNEL VIDEO CONTENT BROWSING IN DIGITAL VIDEO DISTRIBUTION SYSTEMS

CROSS-REFERENCE TO RELATED APPLICATIONS

This application is a continuation of 12/765,793, filed Apr. 22, 2010, and claims priority to U.S. Provisional Application Ser. No. 61,172,355, filed Apr. 24, 2009, the contents of both of which are herby incorporated by reference in their entireties herein.

BACKGROUND

1. Technical Field

The disclosed invention relates to compressed digital video delivery systems such as cable television (CATV), satellite television, Internet protocol television (IPTV) and Internet based video distribution systems. In particular, it relates to the use of a low-delay and layered codec and the corresponding low-delay transport, typically used for videoconferencing systems, in connection with digital video delivery systems to enable fast browsing of video content of multiple TV channels or video files while simultaneously watching one or more selected channels or video files. It is also concerned with the technology used in the endpoints of a digital video delivery system, such as a set-top-box or game console.

2. Background Art

Subject matter related to the present application can be found in co-pending U.S. patent application Ser. No. 12/015,956, filed and entitled "System And Method For Scalable And Low-Delay Videoconferencing Using Scalable Video Coding," U.S. patent application Ser. No. 11/608,776, filed and entitled "Systems And Methods For Error Resilience And Random Access In Video Communication Systems," and U.S. patent application Ser. No. 11/682,263, filed and entitled "System And Method For Providing Error Resilience, Random Access And Rate Control In Scalable Video Communications," and U.S. Pat. No. 7,593,032, filed and entitled "System And Method For A Conference Server Architecture For Low Delay And Distributed Conferencing Applications," each of which is hereby incorporated by reference herein in their entireties.

Traditionally, TV programs are carried over CATV networks. CATV is one of the most popular broadband digital cable networks in Europe, Australia, America, and Asia. With a CATV system, many video channels are multiplexed on a single cable medium with very high bandwidth and distributed through dispersed cable head-end offices that serve a geographical area. The cable head-end of the CATV infrastructure simultaneously carries the digitized and encoded video of each and every channel, regardless of whether the user watches a channel or not.

Recently, IPTV, which transmits TV programs over packet networks, has gained significant momentum due to advantages in delivering new services with ease. One of the drawbacks of IPTV is the relatively narrow bandwidth of the user's access line. For example, a user's access line may be a telephone line employing asymmetric digital subscriber line (ADSL) or similar technologies, which have limited bandwidth available to deliver high quality video content. Sending such a large number of programs at the same time is not practical in an IPTV system due to the aforementioned lack of bandwidth. Furthermore, given the vast amount of video material available over the public Internet, it is practically impossible to deliver all video content of interest to the user simultaneously. In addition, IPTV may rely on public Internet or a private IP network, which may have notable transport delays. In addition, while the CATV infrastructure is designed for broadcast TV systems, video on demand (VoD) and pay per view (PPV) services, which require a unicast transmission to a user's TV for "personalized TV" services, are ideally fit for IPTV.

Endpoints optimized for video conferencing have been disclosed, amongst other things, in co-pending U.S. patent application Ser. No. 12/015,956, incorporated herein by reference. IPTV endpoints share many commonalities with video conferencing endpoints relevant to this invention.

An IPTV endpoint comprises a set of devices and/or software that are located in the user's premises. One typical implementation of IPTV endpoint comprises a network interface (for example a DSL modem, a cable modem, an ISDN T1 interface) connected to the Internet, a set-top-box device that connects via a local area network (for example Ethernet) to the network interface, and a TV monitor. The set-top-box translates the data received from the Internet into a signal format the TV understands; traditionally, a combination of analog audio and video signals are used, but recently also all digital interfaces (such as HDMI) have become common. The set-top-box (on the TV side), therefore typically comprises analog or digital audio/video outputs and interfaces.

Internally, set-top-boxes have a hardware architecture similar to general purpose computers: A central processing unit (CPU) executes instructions stored in Random Access Memory (RAM) or read-only-memory (ROM), and utilizes interface hardware to connect to the network interface and to the audio/video output interface, as well as an interface to a form of user control (e.g., a TV remote control, computer mouse, keyboard, or other similar user input device), all under the control of the CPU. Most set-top-boxes also comprise accelerator units (for example dedicated Digital Signal Processors, DSP) that help the CPU with the computationally complex tasks of video decoding and video processing. Those units are typically present for reasons of cost efficiency, rather than for technical necessity.

General purpose computers, such as personal computers (PCs), can often be configured to act like a set-top-box. In some cases, additional hardware needs to be added to the general purpose computer to provide the interfaces that a typical set-top-box contains, and/or additional accelerator hardware must be added to augment the CPU for video decoding and processing.

The operating system controlling the set-top-box typically offers services that can be used for the present invention, for example, receivers and transmitters according to certain protocols. The protocols of most interest here are those for the transmission of real-time application data: Internet Protocol (IP), User Datagram Protocol (UDP) and/or Transmission Control Protocol (TCP), and Real-time Transport Protocol (RTP). RTP receivers and transmitters are also commonly implemented in the application, rather than in the operating system. Most operating systems support the parallel or quasi-parallel use of more than one protocol receiver and/or transmitter.

The term codec is equally used for the (description of) techniques for encoding and decoding and for implementations of these techniques. A (media) encoder converts input media data into a bitstream or a packet stream, and a (media) decoder converts an input bitstream or packet stream into a media representation suitable for presentation to a user, for example digital or analog video ready for presentation through a monitor, or digital or analog audio ready for presentation through loudspeakers. Encoders and decoders can be dedicated hardware devices or building blocks of a software-based implementation running on a general purpose CPU.

It is possible to build set-top-boxes such that many encoders or decoders run in parallel or quasi-parallel. For hardware encoders or decoders, one easy way to support multiple encoders/decoders is to integrate multiple instances in the set-top-box. For software implementations, similar mechanisms can be employed. For example, in a multi-process operating system, multiple instances of encoder/decoder code can be run quasi-simultaneously.

The basic approach to program navigation, i.e., successive channel skipping or "channel surfing," was suitable in the early days of broadcast TV systems, where there were only a few channels. As the number of broadcasting channels increased to many hundreds, successive channel skipping has become more cumbersome and time consuming. Although several proposed solutions, such as text based electronic program guides, have been offered to alleviate this problem, they are not substitutes for the easy-to-use channel surfing experience of the older systems.

Increases in channel-change times have also made channel surfing more difficult. Digital video codecs, alternatively known as digital video coding/decoding techniques (e.g., MPEG-2, H-series codecs such as H.263 and H.264), and packet network delivery, have increased channel-change times primarily for the following two reasons:

(1) Transport Delays: These delays result from buffering by the decoder at the receiving end, which is necessary to alleviate the effects of: (a) bandwidth changes in the transport network (such as variable link bandwidths experienced in wireless networks); (b) delay jitter caused by varying queuing delays in transport network switches; and/or (c) packet loss in the network.

(2) Encoding Delays: To display a video, the decoder at the receiver, alternatively known as the receiver/receiving end or receiver/receiving application, must receive an I-frame, alternatively known as an intra-coded frame, from the encoder before a video can be decoded. The time distance between I-frames in an encoder is fixed (for example, 0.5 sec or more) to reduce the required coding bandwidth. Therefore, when a user changes a channel, it can take as long as 0.5 seconds or more before the receiver can decode the video. Furthermore, the encoders used in TV systems use "future frames" as well as "previous frames" as references to efficiently compress the current frame. As such, the decoder must wait for both the I-frame and the future reference frames to arrive so that the frames are generated in the correct sequence, causing inherent delays in the instant display of the video.

While CATV and satellite TV systems suffer only from encoding delays, IPTV and other packet network-based video distribution systems also suffer from transport delays, which can involve a significantly longer delay. In the evolving IPTV environment, the channel-change time has become significantly longer, particularly when video channels are delivered over a best effort network such as the public Internet, where the network conditions are completely unpredictable.

In order to improve the channel surfing experience, significant changes are needed. In particular, an encoder is needed that: (a) generates a synchronization frame (i.e., I-frame of the prior systems) without a fixed time delay; (b) employs a small number of future frames to minimize algorithmic delay; and (c) compensates for possible packet loss or insurmountable delay, rather than relying on receiving end buffering as the sole mechanism for error resilience. Because transport delays can cause significant impact to channel-change time, generic video teleconferencing codec cannot completely eliminate the delay problems.

Traditional video codecs, for example H.261 and H.263 (used for person-to-person communication purposes such as videoconferencing) or MPEG-1 and MPEG-2 Main Profile (used in Video CDs and DVDs, respectively), are designed with single layer coding, which provides a single bitstream at a given bitrate. Some video codecs are designed without rate control, thus resulting in a variable bitrate stream (e.g., MPEG-2). However, video codecs used for communication purposes (e.g., H-series codecs) establish a target operating bitrate depending on the specific infrastructure. These video codec designs assume that the network is able to provide a constant bitrate due to a practically error-free channel between the sender and the receiver. The H-series codecs offer some additional features to increase robustness in the presence of channel errors but are still only tolerant to a small percentage of packet losses.

A limitation of single layer coding exists where a lower spatial resolution is required, such as for a smaller frame size. The full resolution signal must be sent and decoded at the receiving end, thus wasting bandwidth and computational resources. However, support for lower resolutions is essential in a channel surfing application displaying several channels simultaneously, as one goal is to fit as many channels displayed in mini browsing windows (MBWs) as possible into a specific screen area, and the MBWs are naturally of lower resolution than the main video program.

Layered codecs, alternatively known as layered coding or scalable codecs/coding, are media (for example, video) compression techniques that has been developed explicitly for heterogeneous environments. In such codecs, two or more layers are generated for a given source video signal: a base layer and at least one enhancement layer. The base layer offers a basic representation of the source signal at a reduced quality, which can be achieved, for example, by reducing the Signal-to-Noise Ratio (SNR) through coarse quantization, using a reduced spatial and/or temporal resolution, or a combination of these techniques. The base layer can be transmitted using a reliable channel, i.e., a channel with guaranteed or enhanced quality of service (QoS). Each enhancement layer increases the quality by increasing the SNR, spatial resolution, or temporal resolution, and can be transmitted with reduced or no QoS. In effect, a user is guaranteed to receive a signal with at least a minimum level of quality of the base layer signal.

Accordingly, there exists a need in the art for techniques for transmitting audio-visual signals using low-delay and layered codec and the corresponding low-delay transport to enable customized display to enable fast channel surfing.

SUMMARY

Techniques for delivery and presentation/display of audio-visual signals over electronic communications network channels are disclosed herein. In an exemplary embodiment, a video server for an IPTV system is disclosed. The system includes a video extractor/transporter (shortly referred to as video extractor) for extracting encoded audio-visual signals from at least one video source, and distributing the signals over the electronic communications network channels. The system also includes control logic which can receive control messages from receivers and invoke the video extractor to extract audio-visual signals therefrom.

In some embodiments, the system can also include a layered video encoder for encoding audio-visual signals representing live content from a camera, e.g., in a base layer and enhancement layer format, for distribution over the electronics communications network channels. The system can also include a video database, which stores audio-visual signals, e.g., encoded in base layer and enhancement layer format.

In some embodiments, the video extractor can be located in a distributed server, and the control logic can be located in a distributed server. The system can also include a layered transcoder for transcoding in real time audio-visual signals from a video database, where the database stores audio-visual signals encoded in a format other than base layer and enhancement layer format.

Methods for preparing audio-visual signals for distribution in an IPTV system over electronic communications network channels are also disclosed.

Disclosed are a systems, methods, and computer-readable media to enable fast channel switching between two channels. The method is known as "side channel mode". An endpoint is configured to receive a first channel in the form of a base layer and a plurality of enhancement layers. Typically, this first channel (base and enhancement layers) is decoded and displayed in a main window. Further, the endpoint is configured to receive at least one second channel in the form of a base layer. This second channel is also decoded, and may be displayed in a Mini Browsing Window (MBW). Upon request by a user for a channel switch from viewing the first channel in the main window to the second channel, in one exemplary embodiment, the decoding of the enhancement layer of the first channel is dropped, the display of the first channel in the main window is stopped, the decoded second channel's content is zoomed to fit the size of the main window and is displayed. Optionally, the decoded base layer of the first channel is displayed in a MBW. Finally, a video extractor is instructed to stop sending the enhancement layer(s) of the first channel and commence sending at least one enhancement layer of the second channel.

The accompanying drawings, which are incorporated and constitute part of this disclosure, illustrate exemplary embodiments of the disclosed invention and serve to explain the principles of the disclosed invention.

BRIEF DESCRIPTION OF THE DRAWINGS

FIG. 1A is a flow diagram illustrating a method in accordance with an exemplary embodiment of the present invention.

FIG. 1B is a flow diagram illustrating a method in accordance with an exemplary embodiment of the present invention.

Figure 2:
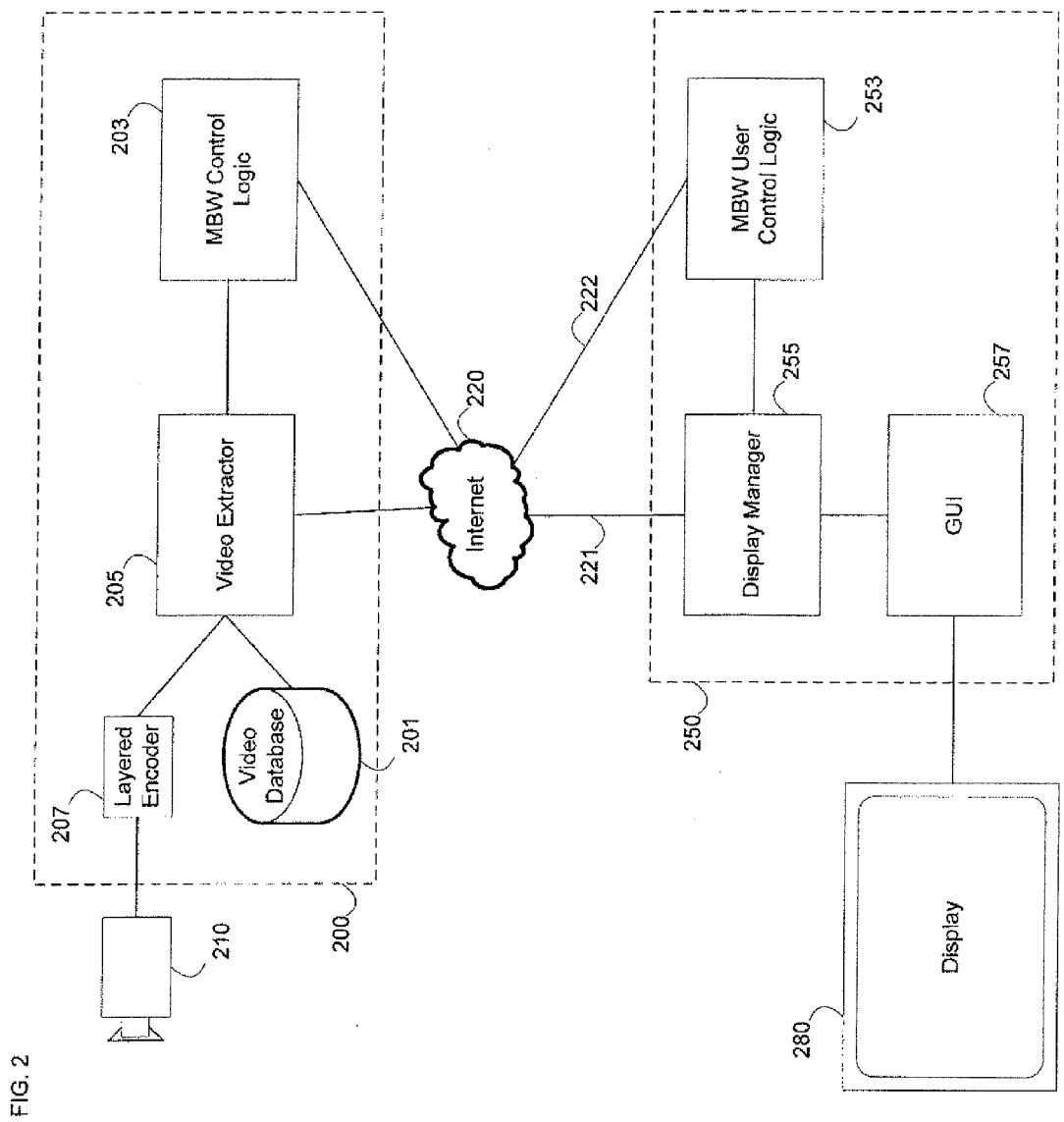
FIG. 2 is a block diagram illustrating an exemplary system for the transmission and display of audio-visual signals in accordance with the present invention.

Throughout the drawings, the same reference numerals and characters, unless otherwise stated, are used to denote like features, elements, components or portions of the illustrated embodiments. Moreover, while the disclosed invention will now be described in detail with reference to the figures, it is done so in connection with the illustrative embodiments.

DETAILED DESCRIPTION

The present invention provides techniques for the distribution and display of digital audio-visual signals, for example, live/on-air (e.g., TV channel), online, or pre-stored video files, in a way that provides for effective video content browsing, alternatively known as channel surfing, and is well suited for any generic digital video distribution system, including those that use packet networks (e.g., IPTV) or public Internet (e.g., video services available on the Internet). Specifically, the techniques provide for a digital video distribution system that allows for display of digital audio-visual signals using a plurality of mini browsing windows, alternatively known as MBWs, of different sizes and numbers that simultaneously display several channels or video programs. The MBWs can be displayed independently or as an overlay on a main window, alternatively known as the full screen, which displays a single TV channel or pre-stored video file. A rapid switching feature provides a user, alternatively known as a TV viewer, with the ability to browse a set of channels while watching one specific channel, and instantly switch to a different set of TV channels for browsing. Thus, the disclosed techniques provide a significantly enhanced channel surfing experience.

In order to achieve instant switching of video content displayed in MBWs, an exemplary digital audio-visual distribution system uses low-delay and layered codec and its associated low-delay transport and random entry features, for example, as described in co-pending U.S. patent applications Ser. Nos. 12/015,956, 11/608,776, and 11/682,263 and U.S. Pat. No. 7,593,032. The present invention avoids the buffering and inherent encoding delays of a classical digital video distribution system and permits fast switching of video content in MBWs, In addition, the present invention optimizes the bandwidth usage by generating multiple layers of video and uses only the lower layers to display video content in the MBWs. These lower layers represent lower resolutions, lower frame rate, or lower SNR, using much less bandwidth and enabling a low processing complexity. These techniques eliminate the need for receiver buffering by introducing slight performance degradation in the event of packet loss or excessive packet delay. In addition, the aforementioned layered codec instantly generates synchronization frames without any need for future frames. Furthermore, layered codec provides rate matching to account for the fact that different channels may be using IP network connections with different bandwidths, which requires different data rates from the encoder.

FIG. 1A illustrates an exemplary method 100 for producing a customized display of audio-visual signals in accordance with the disclosed invention. As shown in FIG. 1A, the process begins 110 when the user inputs information using a graphical user interface (GUI) displayed on a video display which is attached to a receiver.

FIG. 2 illustrates an exemplary receiver 250 in accordance with the disclosed invention. An exemplary receiver 250 can reside, for example, in a user's TV, personal computer, or other type of computer (e.g., an IPTV set-top-box or game console). The TV or computer hosting the receiver 250 is attached to a video display 280, which can be, for example, a TV or computer monitor.

The user can set MBW display configuration preferences through the GUI 257 to invoke actions on a display manager 255. The GUI 257 is a software application similar to a windows based user interface, such as the one used in Microsoft Windows but with reduced functionality.

Figure 8:
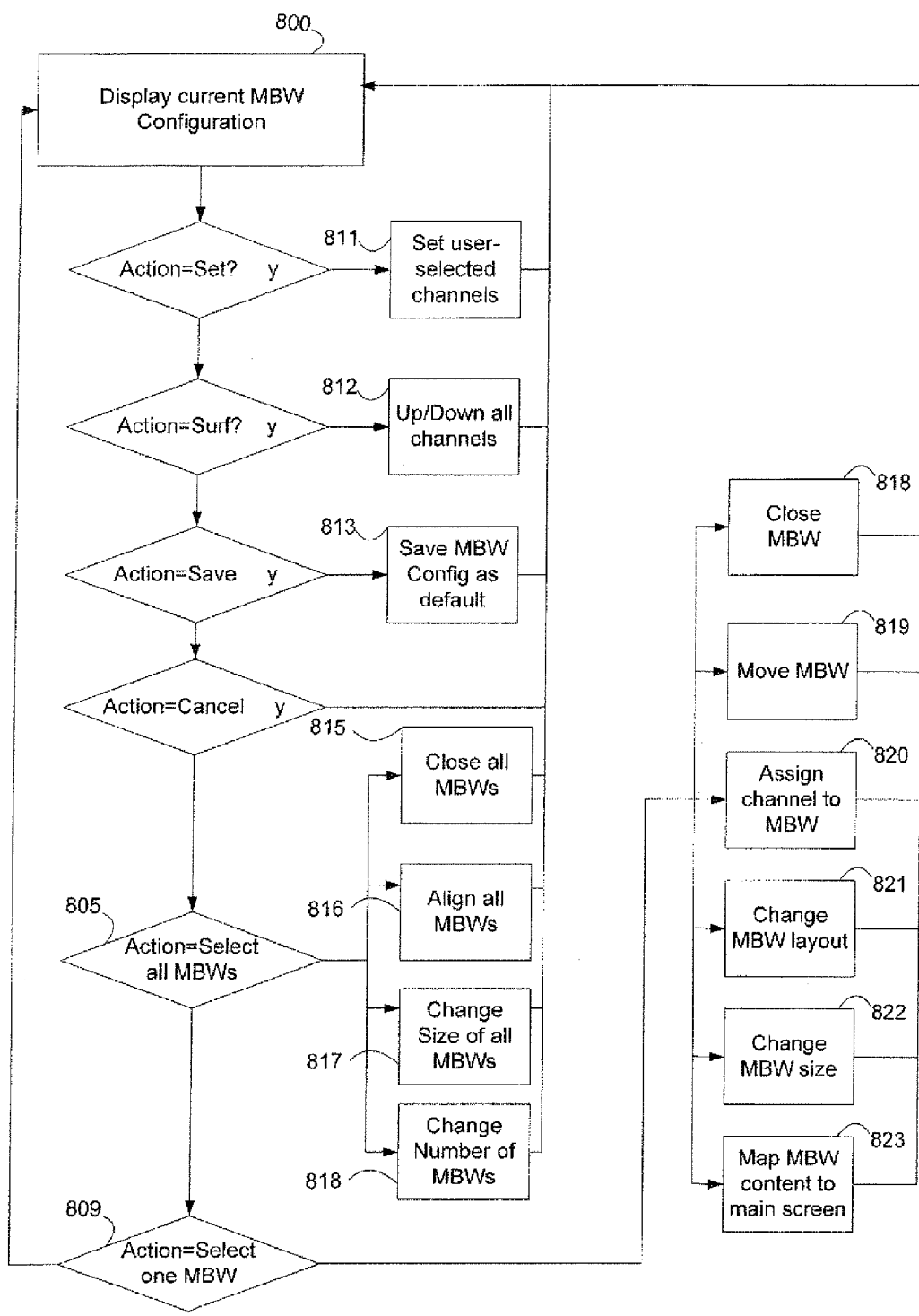
FIG. 8 is a flow diagram illustrating an exemplary GUI logic arrangement in accordance with the present invention.

FIG. 8 illustrates a typical flow diagram for the GUI logic. The GUI logic can be implemented, for example, in a VLSI, ROM, or software. The user can control the GUI, for example, by using a user input pointing device, such as a TV remote control, computer mouse or other pointing device, and can select the number of MBWs 818 (e.g., 2, 4 or more), the window size for each MBW 822 (e.g., first MBW=QCIF, second MBW=QCIF, third MBW=CIF), or the location of the MBWs on video display 816 (e.g., align top, bottom, or side of the screen). There is no technical limit to the number of displayed MBWs. The user can fit as many MBWs as the user desires so long as the total size of all MBWs does not exceed the available display size. There is no minimum limit for MBW size. The user can set the desired size on an MBW by dragging the edges of an MBW window, and/or by creating and setting a desired layout of the MBW. It is also possible to have overlapping MBWs.

Figure 3:
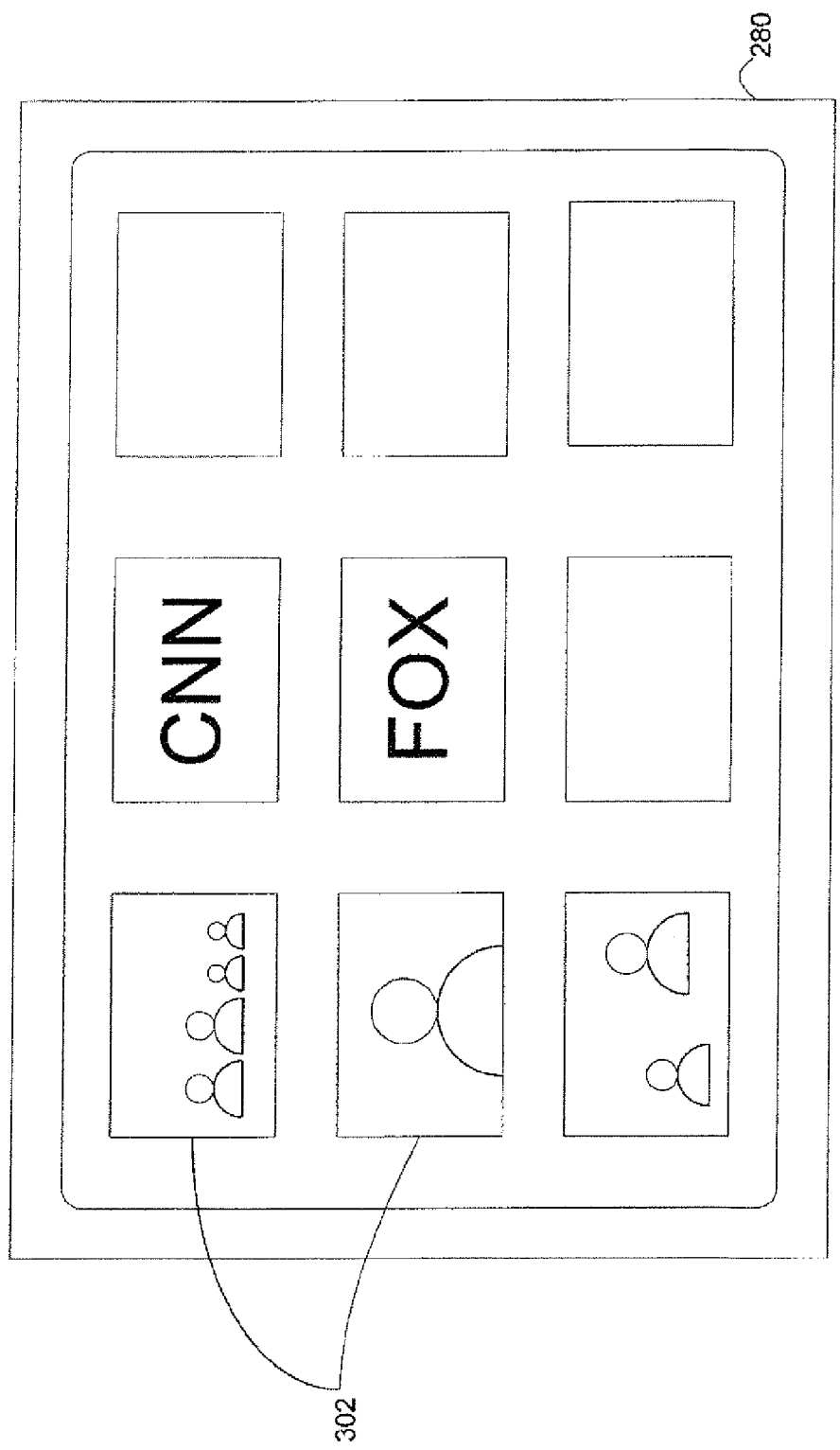
FIG. 3 is an exemplary video display screen in accordance with the present invention.

FIG. 3 illustrates an exemplary video display 280, where nine user-selected MBWs 302 are displayed in three rows that each contains three MBWs 302.

Figure 4:
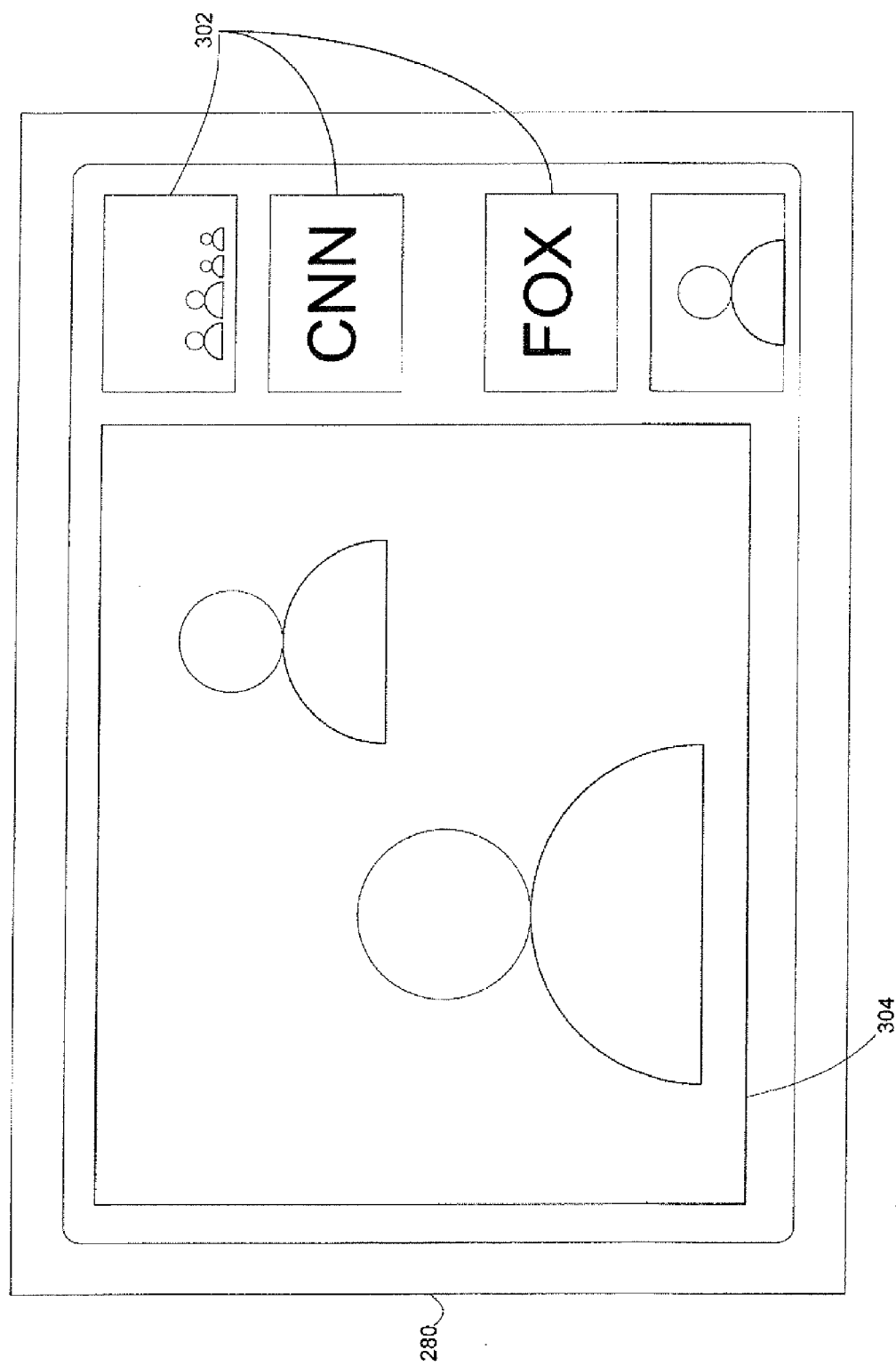
FIG. 4 is an exemplary video display screen in accordance with the present invention.

FIG. 4 illustrates another exemplary video display 280, where a main window 304 displays a selected TV channel with an overlay of four MBWs 302 right-aligned on the video display.

Returning to FIG. 1A, following the user's inputting 110 of viewing preferences; the receiver processes 120 the input and communicates the preferences to the video server.

FIG. 2 illustrates an exemplary display manager 225 and exemplary MBW user control logic 253 contained in receiver 250. The display manager 255 controls the video display 280 while communicating to the MBW user control logic 253 the display settings and the user's MBW display configuration preferences.

Figure 9:
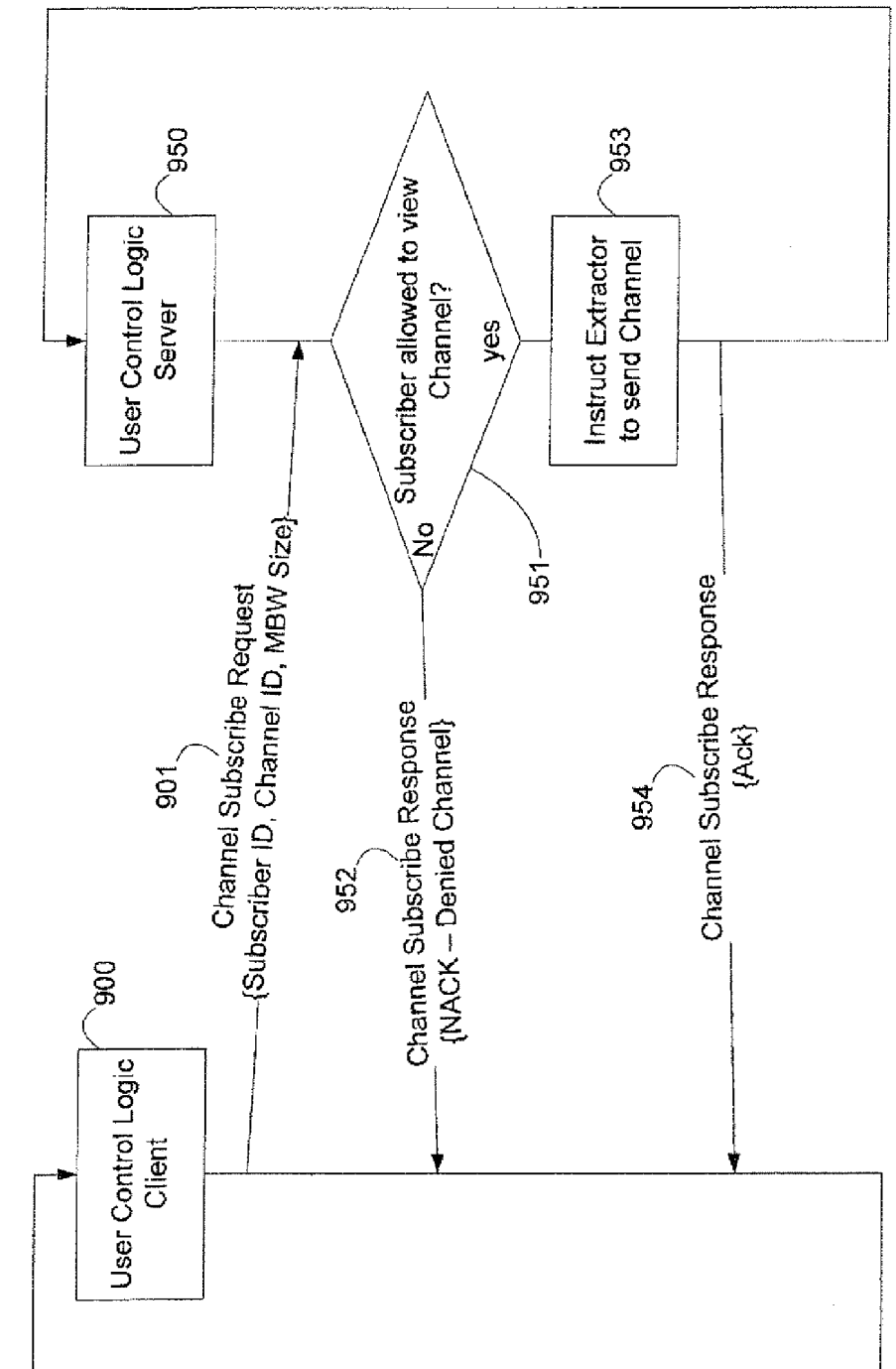
FIG. 9 is a diagram illustrating an exemplary message flow between the user control logic client and user control server in accordance with the present invention.
Figure 10:
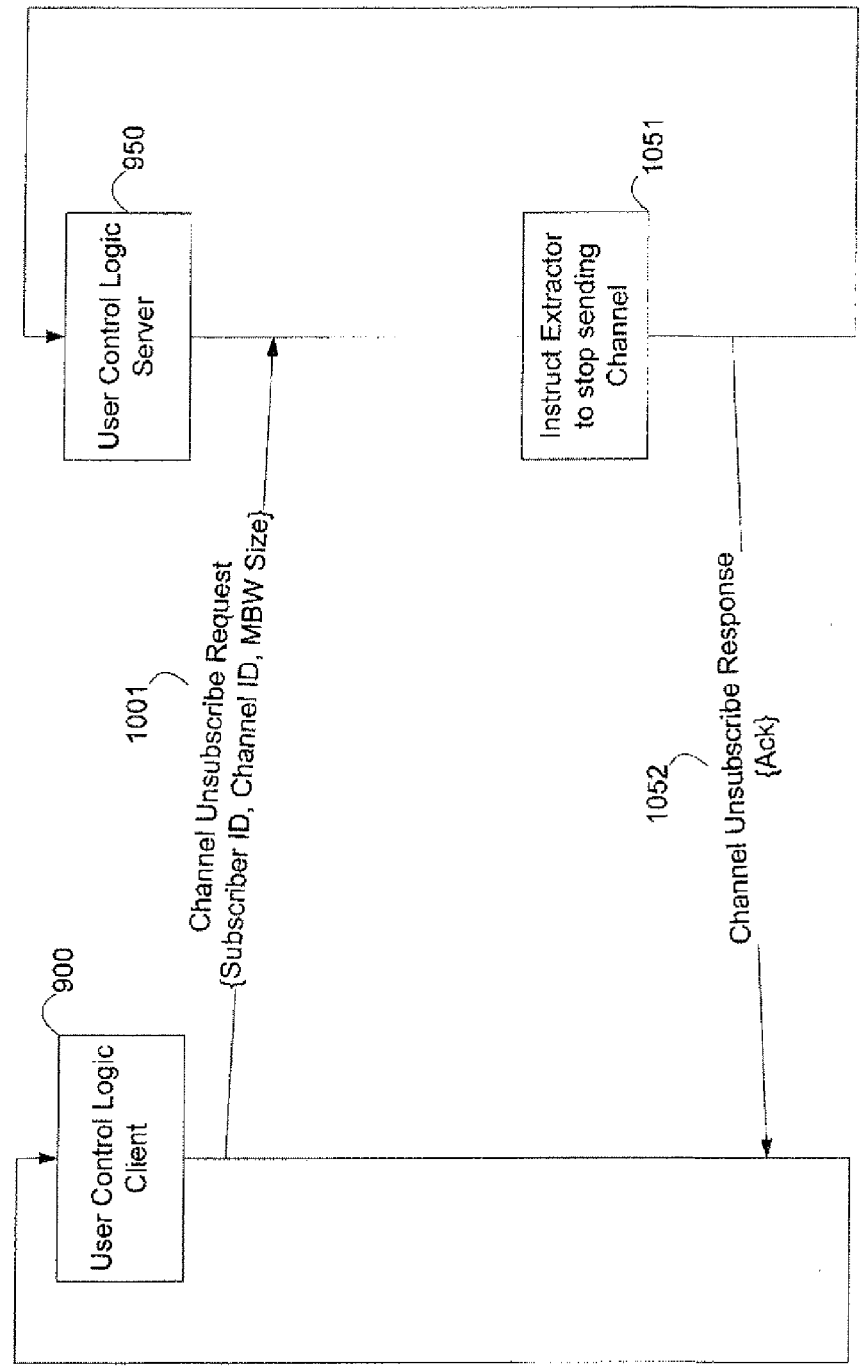
FIG. 10 is a diagram illustrating an exemplary message flow between the user control client and user control server.

As illustrated in FIG. 2, the MBW user control logic 253 communicates with the MBW control logic 203 in video server 200 over Public Internet 220 on line 222, using a protocol such as RTSP or HTTP. FIGS. 9 and 10 illustrate exemplary MBW control logic, which can be implemented, for example, using HTTP or RTSP client/server architecture, as discussed above. Returning to FIG. 2, the MBW user control logic 253 can send user preference information regarding, for example, the video content to map to each MBW or current user operating mode, such as "channel surfing mode," "side-channel mode," or single file "skimming mode" (modes to be discussed below).

Side-channel mode can be triggered when the roundtrip network delay is so large that after the user's request, the delay in changing the displayed video is unacceptable. Note that in this mode, the side channels are sent even though the user is not in channel surfing mode. In the side channel mode, the channel order becomes important. There are two types of channel orders:

(1) Natural order: The order of the channels as defined by the video service provider; and (2) User-selected order: The order of channels of interest to the user defined through the GUI logic. In this scenario, the channel order can be completely different than that of natural order. There may be a much smaller set of channels of interest in the user-selected order.

The video server sends side channels in ascending or descending order according to the direction of the user's channel surfing behavior and in the natural or user-selected channel order.

The assignment of channel to MBW can be static (e.g., always show a specified TV channel on the first MBW), automatically rotational (e.g., rotate six user-selected channels over the first two MBWs every two minutes), or manually user-assigned (e.g., show specified TV content that the user has dragged and dropped from one MBW into another MBW). The MBW user control logic sends a control message only if a configuration change has occurred or a channel change is requested; otherwise it is silent.

FIG. 1B illustrates an exemplary method 150 for transmitting audio-visual signals in accordance with the disclosed invention. As shown in FIG. 1B, the process begins when the video server receives 155 a control message from a receiver. The video server extracts 160 the specified audio-visual signals based on the control message from the receiver.

FIG. 2 illustrates an exemplary video server 200 in accordance with the disclosed invention, for example, a single centralized video server. The video server 200 contains MBW control logic 203, which processes user information received from the receiver 250, such as the desired number or size of the MBWs or the channels or other video content to be mapped to each MBW. The video server 200 can also contain a video extractor 205, which can extract bitstreams from live/on-air video content from a layered encoder 207 or a video database 201 to send to the receiver 250.

Returning to FIG. 1B, if the control message received 161 from the receiver requests live video content, the video server control logic invokes 162 a video extractor to extract specific audio-visual signals. FIG. 2 illustrates an exemplary MBW control logic 203, which can invoke a video extractor 205, to extract a specific audio-visual signal from a layered encoder 207. In an exemplary embodiment, the layered encoder 207 receives live audio-visual signals from a camera 210. The present invention envisions that any type of camera can be used so long as it can produce the highest video resolution selected by the operator. While FIG. 2 illustrates a camera 210 that is external to the video server 200, the present invention envisions that any recording device may be used, either internal or external to the video server 200. In a layered video coding architecture, each encoded TV channel transmits a layered bitstream (base layer plus one or more enhancement layers) using a corresponding number of physical or virtual channels on the network, such as the public Internet. Losses in the enhancement streams will result in a graceful degradation of picture quality.

Returning to FIG. 1B, the layered encoder accordingly selects 163 the correct amount and type of information that is required based on user preference information, such as number or size of MBWs, or properties of the receiver, such available bandwidth. Little or no signal processing is required of the layered encoder in this respect; the layered encoder may simply read the packet headers of the incoming data and selectively forward the appropriate packets to each user. The layered encoder generates the layers needed to display video in MBWs of various sizes without any need for the layered encoder to decode and re-encode the video to generate different special/temporal patterns for each user, and therefore provides no algorithmic delay. More significantly, the computational requirements on the encoder are reduced greatly.

The video extractor extracts 164 appropriate bitstreams directly from the layered encoder. For example, if the user selects a specific TV channel for a first MBW at a QCIF size, the video extractor immediately fetches the layer of the video stream, e.g., base layer, that produces the video content. This process is a simple bit extraction to generate the appropriate layer without requiring any encoding and decoding, and results in delay-free extraction and display.

The video extractor can also be a transporter, performing the interface to the network layer, and providing functions such as packetization (aggregating the various incoming packets to two or more channels (for each MBW)), and transmitting base layer packets over the high reliability channel.

If the control message received 166 from the receiver requests pre-stored audio-visual signals, the video server invokes 167 a video extractor to extract specific audio-visual signals from a video database, and the video extractor 168 extracts appropriate bit streams from the video database. FIG. 2 illustrates an exemplary video database 201, which stores scalable encoded video, also known as stream encoded video, at its original resolution. Video is stored at the highest resolution available containing several enhancement layers on top of the base layer. A wide range of resolutions can be obtained to fit into different MBW sizes from a minimum window size and up by extracting the appropriate layers from the stored video. These videos are stored using one of the standard file formats for scalable video.

Returning to FIG. 1B, the video extractor sends 170 the audio-visual signals to the receiver. FIG. 2 illustrates an exemplary video extractor 205 contained in video server 200, which sends the extracted bit streams to the receiver 250 over the public Internet 220 on line 221 using a protocol such as RTP. While the network illustrated in FIG. 2 is the public Internet 220, the present invention also envisions that video extractor 205 can send the extracted bit streams to the receiver 250 over another network, for example, another IP network, a packet network, a combination of a private IP network and public Internet, or a private network.

Returning to FIG. 1A, after the receiver receives the audio-visual signals from the video server, the receiver displays 130 the video content based on user preferences. The receiver can display 131 the lower layers of video encoded using the layered codec in an MBW for rapid no-delay switchover and display 132 video in the main window using the streamed encoded version to take advantage of buffering and higher performance encoding. If a user selects a MBW to display the MBW's video content on the main window, the receiver can instantly zoom the low resolution material and request from the video server the higher layers of encoded video of that selected video content to improve the video quality. The video in the main window can use: (a) the layered codec by adding higher layer information to create a high resolution video; and/or (b) use prior art video distribution codecs to generate the high resolution video.

An advantage of using (a) is to keep the system simple by using one type of encoder for encoding both the MBWs and the main video. An advantage of using (b) however is to improve the video compression efficiency with the additional complexity of deploying two encoders (one for MBWs and another for the main stream). The present invention can employ best of both worlds. While attaining a fast channel switching in the MBWs with excellent quality video, the exemplary method attains the same TV "bandwidth-quality" performance as the prior art systems when it comes to delivering a selected main program.

Returning to FIG. 1A, after the receiver receives the audio-visual signals from the video server, the receiver plays 140 the audio stream for the corresponding video. The simultaneous playing of each audio stream corresponding to the video content of each MBW would create unintelligible audio. Therefore, the disclosed invention plays the audio stream for the video displayed in the MBW dynamically selected by the user through a pointing device, such as a TV remote control, computer mouse, or other pointing device. In the case where more than one user watches the same set of MBWs, each user can choose to listen to different audio streams; the video server sends separately to each user the audio stream for the video content of the MBW selected by the user.

In the same or another embodiment, the method in FIG. 1B can be used to distribute base layers of different segments of the same pre-stored, i.e., previously encoded video is distributed to the receiver to allow the user to browse the contents of the pre-stored video. If the control message received from the receiver requests different segments of the same pre-stored video file, alternatively known as "skimming mode," the video extractor extracts 168 the base layer of different segments of the same pre-stored video. The extractor sends 170 the base layers for each segment to be displayed in an MBW, thereby saving bandwidth. The "skimming mode" can be further extended to use any type of marker so long as the video can start playing at that marker instantaneously. Markers, well understood in the prior art, contain additional information in the form of special bit sequences that are embedded into the digital video stream. Alternatively, an associated file, alternatively known as a hint track, can be used to store the marker locations in terms of the bit counts from the file beginning. With this method, the video content can be rapidly skimmed. The user can rapidly skim the video content displayed on the MBWs; when the user finds the desired segment, the user can select the MBW and continue to watch the content in the main window in high resolution.

In the same or another embodiment, the method in FIG. 1B can be used for scenarios where there can be unavoidable transport delay caused by propagation delay by a method hereinafter referred to as "side-channeling." These problematic situations arise, for example, where the video server and receiver are far apart (e.g., in different countries). For such a case, instant switching during channel surfing can be very difficult because of delay due to buffering and encoding. Side-channeling works as follows: Assume, for example, that the link connecting the video server to the receiver has a bandwidth capacity B, and B is twice the rate needed to transmit a full resolution video stream used for display on the main window. Also assume that a low resolution video stream (such as the base layer) used for display on a MBW requires only half of the bandwidth required for a full resolution video stream (B/4 in this scenario). When the user is watching a specific channel in natural order in the main window in high-resolution using half of the bandwidth capacity, the server can send two additional channels in low resolution before the bandwidth capacity B is reached. Therefore, for example, if the user is watching TV channel 10, the system can send channel 10 in full resolution, and channels 9 and 11 in low resolution. When the user changes from channel 10 to channel 11, the system instantly displays channel 11 at low resolution.

If the user continues to view channel 11 for more than a specified time (for example, 20 seconds), the video server sends channel 11 at high resolution by including its enhancement layers in the transmission. In addition, the system anticipates that the user is channel surfing upward, i.e., viewing numerically ascending channels. While the user receives channel 11, the video server sends two additional numerically ascending channels, i.e., channels 12 and 13, in low resolution.

If the user does not continue to view channel 11 for the specified time and changes to channel 12, the video server sends channels 13, 14, 15, and 16 in low resolution to fill up the pipe, and so on. If the user changes from channel 11 to channel 9, the video server sends channels 9, 8, 7, 6 If the user changes from channel 11 to channel 20, the video server sends channels 20, 21, 22, and 23.

If the user instead changed from channel 10 to channel 9, the video server anticipates that the user is channel surfing downward, i.e., viewing numerically descending channels, and sends lower channels 8, 7, 6, 5 in low resolution. If the user continues to view channel 9 for the specified time, the video server sends channel 9 in high resolution and channels 8 and 7 in low resolution.

Different variations of side channel implementation are possible. For example, in the same or another embodiment, a user can define a sequence of favorite channels. As the user browses the sequence of favorite channels in numerically ascending or descending order, the video server anticipates the channel surfing, and sends channels, while optimizing bandwidth, accordingly. In the same or another embodiment, the system can choose a sequence of channels for side-channel implementation. The system can choose the channels based on the content of the channel being watched as well (e.g., if the user is watching football video content, other channels displaying football video content can be sent as side-channels). In addition, user preference information can be stored by the video server or by the receiver; if the preferences are stored by the receiver, the MBW control logic requests the user preference information from the receiver.

Figure 5:
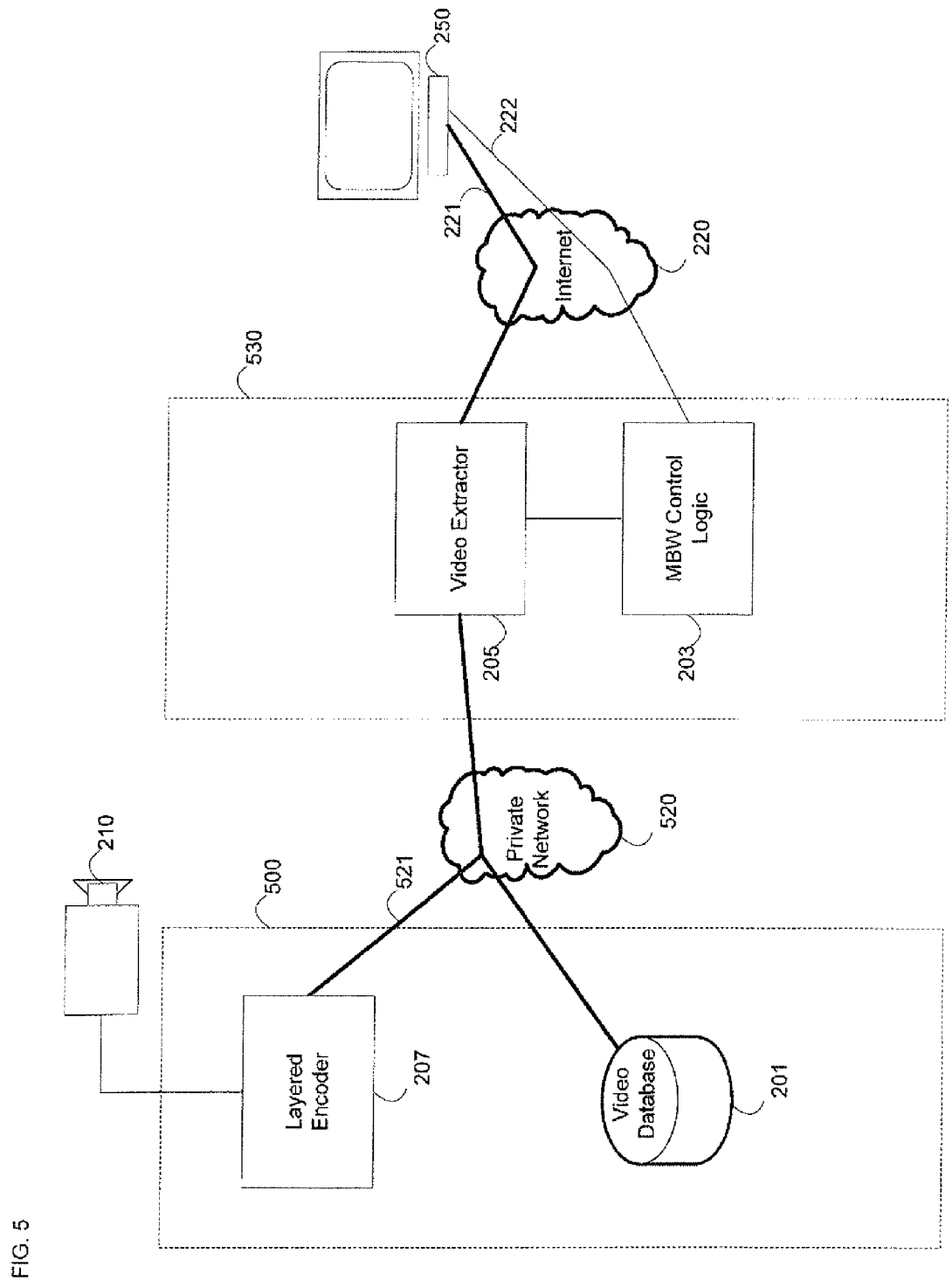
FIG. 5 is a block diagram illustrating an exemplary system for the transmission and display of audio-visual signals in accordance with the present invention.

FIG. 5 illustrates an exemplary video distribution system in accordance with the disclosed invention. The system is comprised of a centralized video server 500, located at the IPTV provider's network, and at least one distributed surfing server 530, a video server located close to user clusters. An exemplary video server 500 contains a video database 201 and a layered encoder 207. In an exemplary embodiment, the video server 500 also contains a camera 210. An exemplary distributed surfing server 530 contains a video extractor 205 and MBW control logic 203. In an exemplary embodiment, at least one distributed surfing server 530 is located in a network near the Head-End Offices of the IPTV provider network. The video server 500 and distributed surfing servers 530 communicate over either a private network 520, designed solely to handle video traffic between the video server 500 and distributed surfing servers 530, or over the public Internet.

The distributed architecture shown in FIG. 5 enables more bandwidth savings by using an application layer multicast architecture. In an exemplary embodiment, more than one receiver 250 sends a request for a specified video content to be displayed in a MBW at QCIF resolution. MBW control logic 203 receives the requests over the public Internet 220 on line 222, using a protocol such as RTSP or HTTP. MBW control logic 203 sends a request to the video extractor 205 to extract the video content from the video database 201, if pre-stored video content, or from the layered encoder 207, if live/on-air video content. The video extractor 205 extracts a single bitstream (i.e., the base layer of the video content) from the video database 201 or layered encoder 207, which is carried downstream over the private network 520 in link 521, using a protocol such as RTP. The video extractor 205 sends a copy of the video content to each requesting receiver 250 over the public Internet 220 using a protocol such as RTP. In doing so, only one copy of the video content is sent from the video server 500 to the distributed surfing server 530, located near a Head-End Office, where the multiplication of video content is realized. As such, the multiple versions of the same video content have been carried over a shorter distance.

Figure 6:
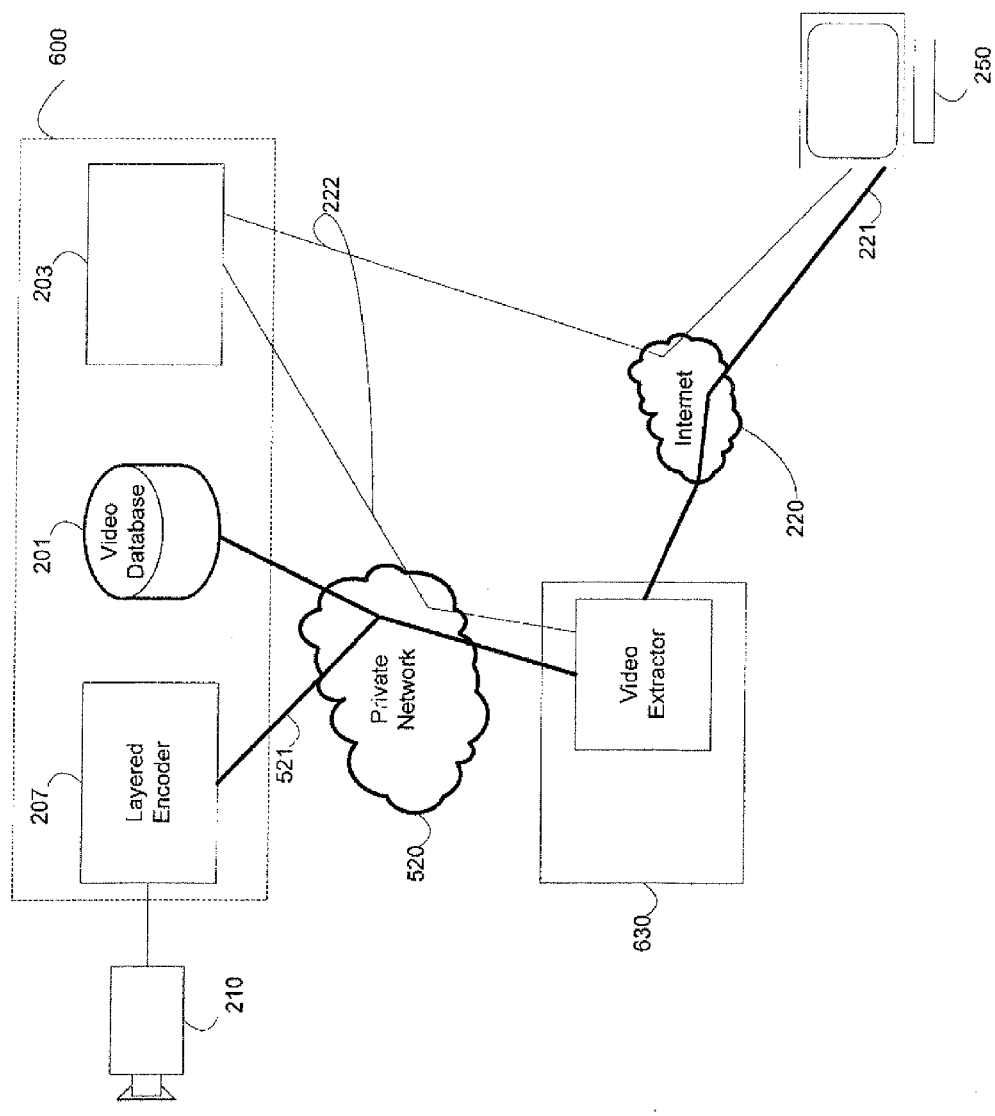
FIG. 6 is a block diagram illustrating an exemplary system for the transmission and display of audio-visual signals in accordance with the present invention.

FIG. 6 illustrates an exemplary video distribution system in accordance with the disclosed invention. The system includes a centralized video server 600, located at the IPTV provider's network, and at least one distributed video server 630, located close to user clusters.

An exemplary video server 600, contains a video database 201, layered encoder 207, camera 210, and MBW control logic 203. An exemplary distributed surfing server 630 contains a video extractor 205. In an exemplary embodiment, at least one distributed surfing server 630 is located in a network near the Head-End Offices of the IPTV provider network. The video server 600 and distributed surfing servers 630 communicate over either a private network 520, designed solely to handle video traffic between the video server 600 and distributed surfing servers 630, or over the public Internet.

A distributed system architecture similar to those shown in FIGS. 5 and 6 enables more bandwidth savings by using an application layer multicast architecture. As long as the architecture provides for communications between the video extractor and the video database and layered encoder remain similar to that shown in FIGS. 5 and 6, the video distribution system can achieve the same multicast video network bandwidth savings advantages, while maintaining a centralized copy of all the MBW mappings in the user displays.

Figure 7:
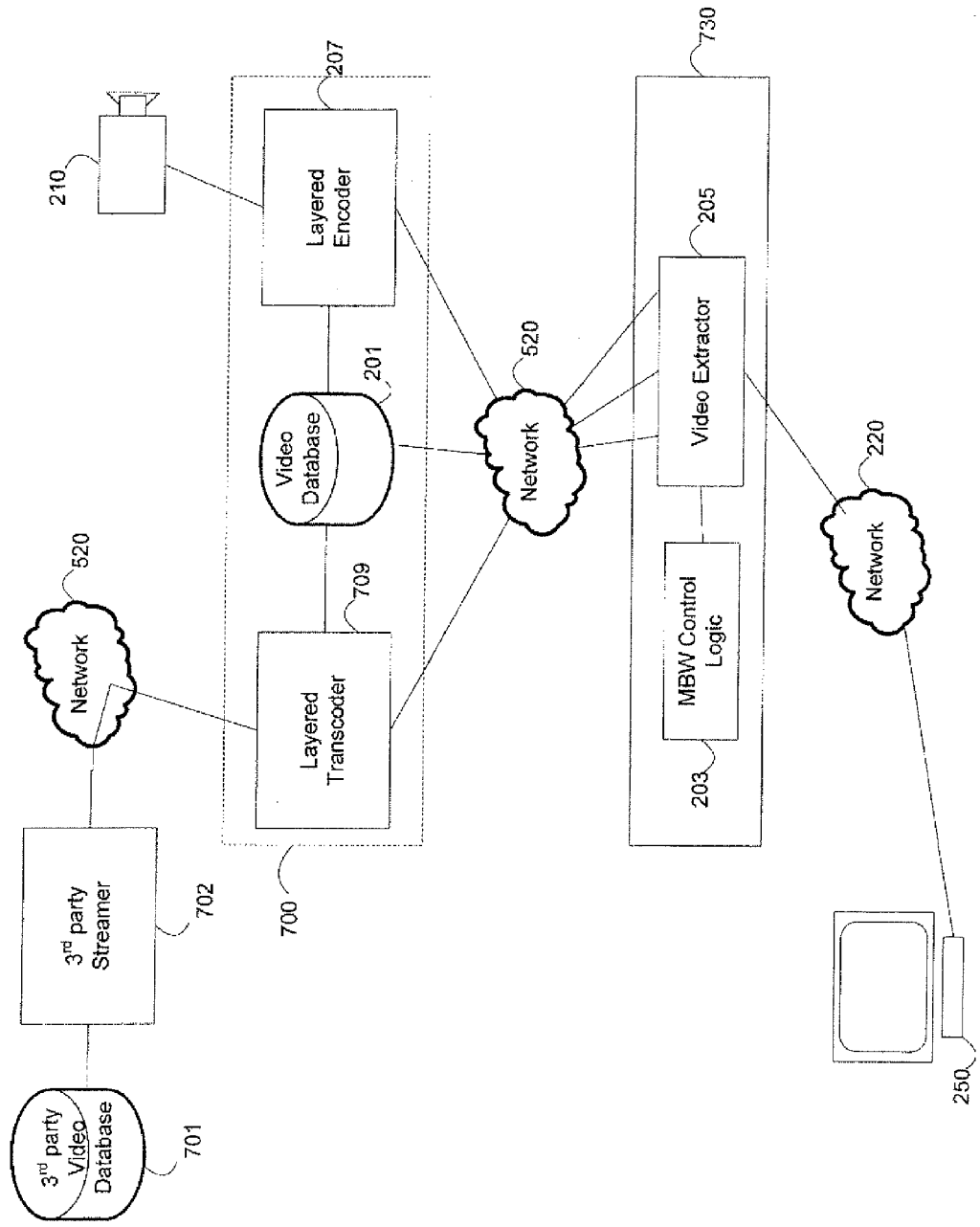
FIG. 7 is a block diagram illustrating an exemplary system for the transmission and display of audio-visual signals in accordance with the present invention.

FIG. 7 illustrates an exemplary video distribution system in accordance with the disclosed invention. The system is comprised of a centralized video server 700, located at the IPTV provider's network, and at least one distributed surfing server 730, a video server located close to user clusters. An exemplary centralized video server 700 contains a video database 201, a layered encoder 207, a camera 210, and a layered transcoder 709. An exemplary distributed surfing server 730 contains a video extractor 205 and MBW control logic 203. The layered transcoder 709 in the centralized video server 700 transcodes in real-time video from a third party video database 701, which stores videos encoded by other methods, for example, Microsoft Windows Media, Apple Quicktime, Adobe Flash. These videos can be sent over the private network 520 to the layered transcoder 709 by any server, for example, a third party streamer 702. The layered transcoder 709 allows for the distribution of video content stored by third party databases accessible over the private network 520 without requiring that the third party's encoding methods comply with the codec methods described in co-filed U.S. patent application Ser. Nos. 12/015,956 and 11/608,776, and U.S. Pat. No. 7,593,032. While the layered transcoder 709 accesses a third party database over the private network 520, the present invention also envisions that the layered transcoder 709 can access a third party database 701 over another network, for example, another IP network, a packet network, a combination of a private IP network and public Internet, or a private network. Once the system has access to a remote third party database 701, it can selectively transcode, i.e., only transcode the most watched content.

FIG. 8 illustrates a typical flow diagram for the GUI logic. Initially, the GUI presents the current MBW configuration 800. The user can perform, for example, the following actions: set user-selected channels 811 (i.e., define a subset of channels for the user-selected order, as described below), surf channels 812 in natural order or user-selected order (as described detail below), save a current MBW configuration as the default 813, select all MBWs 805 for further action, select one MBW 809 for further action, or cancel 804, where any menu displayed on the video display is closed without any change to the current MBW configuration.

If the user selects all MBWs for further action 805, the user can: close all the MBWs 815, align all the MBWs 816 (e.g., align top, bottom, or side of the screen), or change the window size for the MBWs 817 (e.g., first MBW=QCIF, second MBW=QCIF, third MBW=CIF), or select the number of MBWs 818 (e.g., 2, 4 or more).

If the user selects one MBW for further action 809, the user can: close the MBW 818, move the MBW 819, assign a channel to be displayed on the MBW 820, change the MBW layout 821, change the MBW size 822, or select the content in the MBW for display in the main window 823.

Following the user input, the receiver processes the input and communicates the preferences to the video server.

FIG. 9 illustrates an exemplary channel subscription messaging flow where, for example, a user requests that a channel be assigned to an MBW. The MBW user control logic 900 located at the receiver sends a channel subscribe request message 901 to the MBW control logic 950 located at the video server. The MBW control logic 950 determines 951 whether the MBW user control logic 900 is allowed (e.g., has a subscription to a specific PPV channel) to view the channel. If not, the MBW control logic 950 sends a channel subscribe response message 952 indicating that the channel request is denied. If the MBW user control logic 900 does have proper access, the MBW control logic 950 instructs 953 the video extractor to send the channel to the receiver, and sends a channel subscription response message 954 indicating that the channel request is granted.

FIG. 10 illustrates another exemplary channel subscription messaging flow where, for example, the user closes an MBW (i.e., a channel un-assignment process). The MBW user control logic 900 located at the receiver sends a channel unsubscribe request 1001 to the MBW control logic 950 located at the video server. The MBW control logic 950 instructs 1051 the video extractor to stop sending the channel to the receiver, and sends a channel unsubscribe response message 1052 to the MBW user control logic 900 acknowledging the request.

FIGS. 9 and 10 illustrate exemplary MBW user control clients, which can be implemented, for example, using HTTP client/server architecture, where the channel subscribe/unsubscribe request/response messages can be HTTP request/response message types where the content of the message can be appropriately formatted using HTTP. While FIGS. 9 and 10 illustrate HTTP client/server architecture, the present invention envisions that the client and server components can be implemented using RTSP client/server architecture. Note that RTSP provides an added benefit of VCR type controls, such as pause, rewind, seek, start, and stop actions.

We claim:

1. A method for preparing a plurality of audio-visual signals for distribution in an IPTV system to at least one receiver and distributing said audio-visual signals over two or more electronic communications network channels, comprising:
    (a) processing one or more control messages from one or more receivers, wherein said control message comprises:
        a request to avoid propagation delay at a receiver;
        a request to change from displaying a first audio-visual signal to displaying a second audio-visual signal at said receiver;
        duration of time data to display said second audio-visual signal; and
        bandwidth data for said receiver;
    (b) receiving one or more encoded format audio-visual signals from at least one video source, said encoded format comprising a base layer and enhancement layer format, wherein said video source comprises a video database that stores a plurality of audio-visual signals encoded in base layer and enhancement layer format;
    (c) extracting, in an extractor, for distribution to the one or more receivers, in response to said one or more control messages, a first audio-visual signal from said received encoded format audio-visual signals, and at least a base layer of a second audio-visual signal that said receiver is anticipated to display in subsequent display changes; and
    (d) distributing said extracted audio-visual signals to said one or more receivers, wherein the video source and the extractor are not co-located.

2. The method of claim 1, wherein said video source comprises a video encoder that receives a plurality of audio-visual signals from a live recording device and encodes said audio-visual signals in base layer and enhancement layer format.

3. The method of claim 1, wherein said video source comprises a video transcoder, which encodes a plurality of audio-visual signals stored in a third party video database, wherein said third party video database stores a plurality of audio-visual signals encoded in a format other than base layer and enhancement layer format.

4. The method of claim 1, wherein said extracting further comprises, in response to a condition wherein said duration of time exceeds a pre-determined threshold:
    (a) extracting said base layer and enhancement layers of said second audio-visual signal; and
    (b) extracting a plurality of additional base layers of audio-visual signals that said receiver is anticipated to display in subsequent display changes until said maximum bandwidth of said receiver is met.

5. A non-transitory computer-readable medium comprising a set of instructions to direct a processor to perform the methods recited in one of claims 1-4.

* * * * *